United States Patent [19]

Cisternino et al.

[11] Patent Number: 4,925,357
[45] Date of Patent: May 15, 1990

[54] LOAD TRANSPORT DOLLY

[75] Inventors: Andrew J. Cisternino, Marietta; William S. Spamer, Roswell, both of Ga.

[73] Assignee: The Mead Corporation, Dayton, Ohio

[21] Appl. No.: 338,745

[22] Filed: Apr. 17, 1989

[51] Int. Cl.$^5$ ............................................. B65G 67/04
[52] U.S. Cl. .................................. 414/495; 254/8 R; 414/428
[58] Field of Search ............................ 414/426–429, 414/458, 495; 254/2 R, 2 B, 8 R, 8 B

[56] References Cited

U.S. PATENT DOCUMENTS

| | | | |
|---|---|---|---|
| 2,170,607 | 8/1939 | Green | 414/428 |
| 2,217,898 | 10/1940 | Gemmill | 414/427 |
| 2,231,192 | 2/1941 | Olsen | 414/428 |
| 2,386,516 | 10/1945 | Thompson | 414/428 X |
| 2,804,983 | 9/1957 | Wolf | 414/428 |
| 3,301,419 | 1/1967 | Molden et al. | 414/428 |
| 4,460,306 | 7/1984 | Hawkins | 414/427 |
| 4,690,605 | 9/1987 | Coccaro | 414/427 X |

Primary Examiner—David A. Bucci
Attorney, Agent, or Firm—Rodgers & Rodgers

[57] ABSTRACT

A dolly including a frame together with an a plurality of casters mounted on the frame for low friction movement of the frame along a supporting surface together with elevating mechanism mounted on the frame and spaced below a part of the load when the dolly is inserted underneath the load, the elevating mechanism being operable to engage and to impart upward movement to the load and out of engagement with the supporting surface so that easy transport of the load is accommodated.

7 Claims, 1 Drawing Sheet

LOAD TRANSPORT DOLLY

TECHNICAL FIELD

This invention relates to the transport of preassembled displays of consumer products into display positions in supermarkets or in to storage areas.

BACKGROUND ART

U.S. Pat. No. 4,213,624 issued Jul. 22, 1980 for Pallet Transport system discloses a dolly whose elevation above floor level may be changed by changing the level of the dolly wheels relative to the dolly frame. Such an arrangement is both time consuming and somewhat tedious because the individually adjustable wheels must be uniformly adjusted in relation to the dolly frame in order to insure that one or more of the dolly wheels is not disposed at a level different from the level of the remaining dolly wheels.

SUMMARY

According to this invention in one form, a dolly is provided and comprises a frame, a plurality of casters mounted on the frame to accommodate low friction movement of the dolly along a supporting surface and being adapted for insertion underneath a part of a load to be transported together with elevating means mounted on the frame and having an initial position spaced somewhat below a part of the load and moveable to an operated position of uplifting engagement with said part of the load whereby the load is moved upwardly away from the supporting surface.

BEST MODE OF CARRYING OUT THE INVENTION

Figure 1:
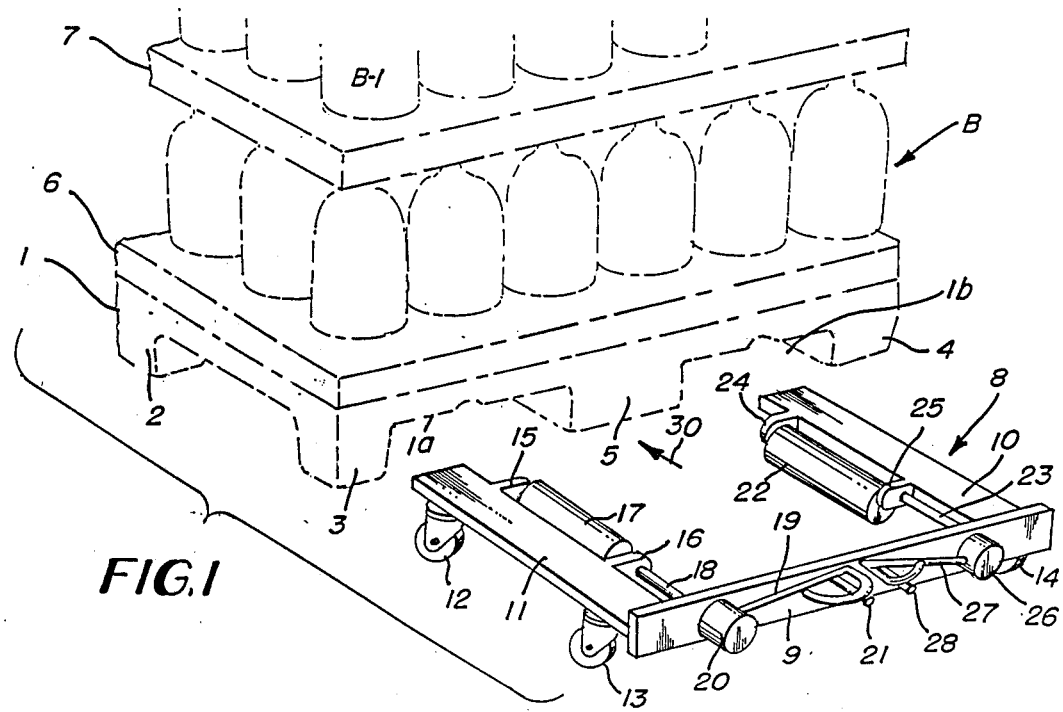
FIG. 1 is a perspective view of a dolly formed according to this invention together with a load shown in phantom lines and which includes a base module together with tier separating sheets.

With reference to FIG. 1, the numeral 1 designates a module which constitutes the base of an article display or pallet such as might be used in retail outlets or in some instances which might be used for article storage purposes. Module 1 includes corner posts 2, 3 and 4 together with another corner post not observable in FIG. 1. A center post 5 may or may not be provided in connection with module 1. A companion post to center post 5 may or may not be provided but is not observable in FIG. 1. In one application of the invention an article support sheet 6 is disposed atop module 1 and supports a plurality of articles such as bottles B. For other applications of the invention, the supports are built in. Another tier of bottles such as B-1 is disposed atop the bottles B and separated therefrom by a middle tier sheet 7. If desired, several additional tiers of displayed items such as bottles B and B1 may be stacked atop the module 1.

Ordinarily a display of items such as bottles B is prearranged for display or storage. Movement of an assembled display is provided by a dolly formed according to this invention.

As is best shown in FIG. 1 is solid lines, the dolly comprises a frame generally designated by the numeral 8. This frame is generally U-shaped in configuration and comprises a bight portion 9 together with a pair of prongs 10 and 11. This frame is mounted on casters 12, 13, 14 and another caster not observable in the drawings and which is located at the far end of prong 10.

Elevating means is provided in accordance with this invention and includes a pair of studs 15 and 16 which are rigidly secured to the inner surface of prong 11 and elongated element 17 is provided with an off center shaft 18 which is rigidly secured to eccentrically mounted cylindrical element 17. The shaft 18 is journally mounted in studs 15 and 16 and in the bight portion 9 of the frame 8. A manually operable crank 19 is rigidly secured to the outer end portion 20 which is rigidly secured to the outwardly projecting portion of the eccentrically mounted cylindrical element 18. The normal inactive position of crank 19 is determined by stop 21 which is fixedly mounted to the bight portion 9 of frame 8.

A complementary elevating means to that just described is also provided and is associated with prong 10. This elevating means comprises an elongated eccentrically mounted cylindrical element 22 having off center shaft 23 which is journally supported by the studs 24 and 25 which are affixed rigidly to prong 10. The outwardly projecting end of the shaft 23 is also journally mounted in the bight portion 9 of frame 8 and a crank arm 27 is rigidly secured to outwardly projecting part 26 of shaft 23. A stop 28 determines the at rest position of the elevating mechanism by forming an abutment for crank 27.

Figure 2:
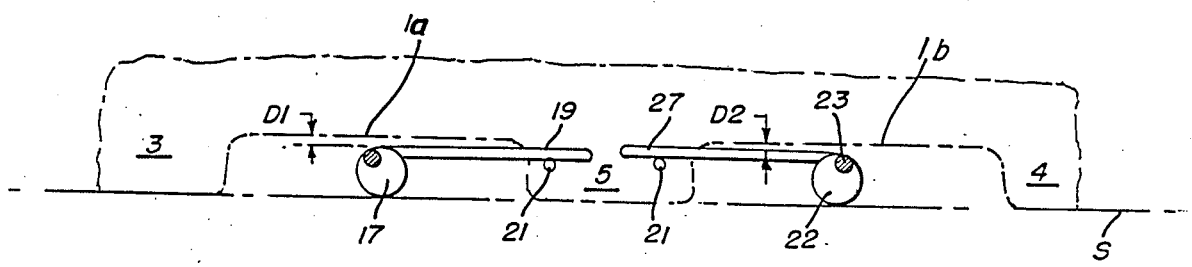
FIG. 2 is a schematic view of elevating means formed according to this invention and shown underneath the module to be lifted and with the elevating means disposed below the module load and spaced therefrom by a small clearance distance.

Once a display is assembled as indicated in phantom lines in FIG. 1, the dolly formed according to this invention is moved underneath the display so that the prongs 10 and 11 together with the elevating mechanisms associated therewith are moved underneath the display and between the posts 3 and 4 and onto opposite sides of the center post 5 as is obvious from FIG. 1. Such direction of movement is indicated by the arrow 30. With the dolly arranged underneath the load as indicated schematically in FIG. 2, the lower surface 1a of module 1 is disposed above the elongated cylindrical element 17 by a short distance indicated at D1 in FIG. 2. Likewise, the portion 1b of module 1 is spaced somewhat above the elongated cylinder 22 as indicated at D2 in FIG. 2 so that the elongated cylindrical elements 17 and 22 are in initial positions slightly spaced below parts 1a and 1b of the module 1 so as to accommodate free and easy clearance as the dolly is moved under the display.

Figure 3:
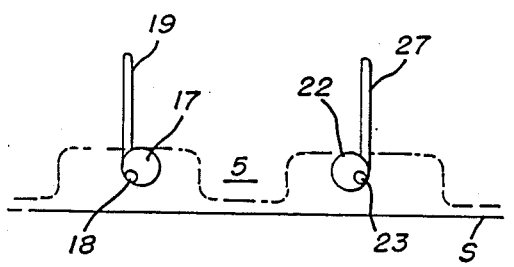
FIG. 3 is a schematic diagram on a reduced scale from that shown in FIG. 2 and which shows the elevating mechanism in its intermediate position.
Figure 4:
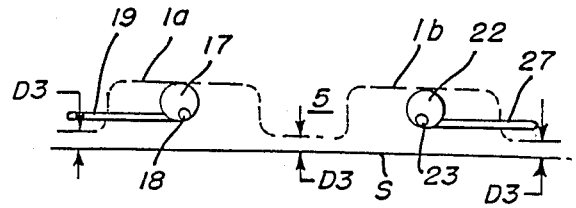
FIG. 4 is a view similar to FIG. 3 which shows the elevating mechanism in its final uplifting position whereby the base module is spaced above its associated supporting surface.

In order to lift the display so that its supporting posts are moved upwardly and out of engagement with the supporting surface S, the crank 19 is moved in a counterclockwise direction through the position indicated in FIG. 3 and into the final position indicated in FIG. 4. For come applications of the invention, the crank 19 and associated parts may be arranged to rotate clockwise to lift the load as is obvious. The crank arm 27 is moved in a clockwise direction through the position indicated in FIG. 3 and into the final uplifting position indicated in FIG. 4. Of course crank arm 27 and other parts may be arranged to rotate in a counterclockwise direction to lift the load. In FIG. 4, the spacing between the bottoms of the posts such as 2, 3, 4 and 5 and the supporting surface such as the floor indicated at S is indicated in FIG. 4 at D3. In practice D3 is an adequate clearance between the bottom surfaces of the posts and the supporting surface S such as the floor of a retail outlet or of a warehouse or the like so as to accommodate free movement of the display.

Figure 5:
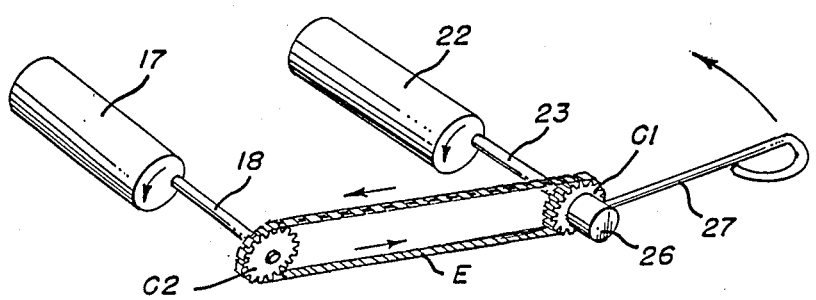
FIG. 5 is a perspective view of a modification of the invention whereby elevating eccentrically mounted cylinders are operated by a single crank.

If desired, a pair of cogs such as C1 and C2 may be secured to shafts 23 and 18 respectively and endless element E may be used to rotate shaft 18 by operation of the single crank 27 as shown in FIG. 5 provided the angular dispositions of the cylinders 17 and 22 are properly determined.

For use in connection with heavy loads, a pair of elongated cylindrical elements and associated parts as shown in FIG. 4 may be mounted on each prong such as 8 and 11 instead of the single elements such as 17 and 22 and such elements may be driven by a chain such as E as shown in FIG. 4.

Thus by the invention an efficient and durable dolly is provided which is particularly useful in connection with displays which can easily pass through limited areas such as narrow doorways and the like and which may be too narrow to accommodate the passage of wide forklift trucks and the like.

I claim:

1. A dolly comprising a unitary frame including a U-shaped bight portion with a pair of parallel prongs, a plurality of casters mounted on said frame and engageable with a supporting surface to accommodate low friction movement of the dolly along said supporting surface, said frame and casters being adapted for insertion underneath a part of a load to be transported, and elevating means having a pair of cylindrical elongated elements each having an integral off center shaft rotatably mounted respectively on a pair of studs rigidly secured to an inner surface of each of said prongs and having an initial position in spaced relation below said part of said load and movable to an operated position of uplifting engagement with said part of said load whereby said load is moved upwardly away from said supporting surface and means for rotating said shafts.

2. A dolly comprising a frame including a U-shaped bight portion with a pair of parallel prongs, a plurality of casters mounted on said frame and engageable with a supporting surface to accommodate low friction movement of the dolly along said supporting surface, said frame and casters being adapted for insertion underneath a part of a load to be transported, and elevating means having a pair of elongated elements eccentrically mounted respectively on a pair of studs rigidly secured to an inner surface of each of said prongs and having an initial position in spaced relation below said part of said load and movable to an operated position of uplifting engagement with said part of said load whereby said load is moved upwardly away from said supporting surface, each of said elongated elements being cylindrical, and an off-center shaft rigidly secured within each elongated element and housing outwardly projecting end portions journally mounted in the associated pair of said studs and one of said end portions being operably related with means for imparting rotation thereto.

3. A dolly according to claim 2 wherein one of said outwardly projecting end portions associated with each of said elongated elements includes an end and is journally mounted in said bight of said frame.

4. A dolly according to claim 3 wherein a crank arm is rigidly secured to said one of each of said outwardly projecting end portions.

5. A dolly according to claim 4 wherein a pair of fixed stops are mounted on said bight portion and engageable respectively with said crank arms so as to determine said initial position of said elevating means.

6. A dolly according to claim 3 wherein a cog is rigidly secured to the end of each of said outwardly projecting end portions which is journally mounted in said bight of said frame and wherein an endless element is trained over said cogs and wherein a crank is secured to said end of one of said outwardly projecting end portions.

7. A dolly comprising a frame including a U-shaped bight portion wth a pair of a parallel prongs, a plurality of casters mounted on said frame and engageable with a supporting surface to accommodate low friction movement of the dolly along said supporting surface, said frame and casters being adapted for insertion underneath a part of a load to be transported, and elevating means having a pair of elongated elements eccentrically mounted respectively on a pair of studs rigidly secured to an inner surface of each of said prongs and having an initial position in spaced relation below said part of said load and movable to an operated position of uplifting engagement with said part of said load whereby said load is moved upwardly away from said supporting surface, said elongated elements being rotated by an endless driving element.

* * * * *